United States Patent
Wang et al.

(10) Patent No.: US 12,405,571 B2
(45) Date of Patent: Sep. 2, 2025

(54) LARGE-DEPTH METASURFACE POLARIZATION HOLOGRAPHIC 3D DISPLAY METHOD

(71) Applicant: BEIHANG UNIVERSITY, Beijing (CN)

(72) Inventors: Qionghua Wang, Beijing (CN); Di Wang, Beijing (CN); Yilong Li, Beijing (CN); Qian Huang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 18/911,429

(22) Filed: Oct. 10, 2024

(65) Prior Publication Data
US 2025/0164929 A1 May 22, 2025

(30) Foreign Application Priority Data
Nov. 22, 2023 (CN) .......................... 202311561884.3

(51) Int. Cl.
*G03H 1/08* (2006.01)
*G02B 30/25* (2020.01)
*G03H 1/04* (2006.01)
*G03H 1/22* (2006.01)
*G03H 1/00* (2006.01)

(52) U.S. Cl.
CPC .......... *G03H 1/0808* (2013.01); *G02B 30/25* (2020.01); *G03H 1/0443* (2013.01); *G03H 1/0866* (2013.01); *G03H 1/22* (2013.01); *G03H 2001/0088* (2013.01)

(58) Field of Classification Search
CPC .. G03H 1/0808; G03H 1/0443; G03H 1/0866; G03H 1/22; G03H 2001/0088; G03H 2222/31; G03H 1/2294; G03H 1/0005; G02B 30/25
See application file for complete search history.

(56) References Cited

U.S. PATENT DOCUMENTS

| | | | |
|---|---|---|---|
| 2013/0170004 A1* | 7/2013 | Futterer | G02B 6/0046 359/9 |
| 2014/0055692 A1* | 2/2014 | Kroll | G02B 30/20 29/846 |
| 2016/0327906 A1* | 11/2016 | Futterer | G03H 1/2294 |

\* cited by examiner

*Primary Examiner* — Richard T Torrente
(74) *Attorney, Agent, or Firm* — Pilloff Passino & Cosenza LLP; Rachel K. Pilloff; Sean A. Passino

(57) ABSTRACT

Disclosed is a large-depth metasurface polarization holographic 3D display method, including: performing calculations for a first 3D object and a second 3D object based on an angular spectrum diffraction theory to obtain a first metasurface hologram and a second metasurface hologram; performing interleaved row-by-row insertion of the first and the second metasurface holograms to encode into a synthetic hologram, optimizing phases of the synthetic hologram by using an error diffusion algorithm to obtain phase information required by metasurface structures, that is, meta-phase information; designing the metasurface structures based on the meta-phase information, and making a metasurface structure in odd rows sensitive to left-handed circularly polarized light, and a metasurface structure in even rows sensitive to right-handed circularly polarized light to achieve independent control over different polarization states; and performing holographic 3D reconstruction by illuminating the metasurface structures with laser.

4 Claims, 4 Drawing Sheets

Metasurface structure

LARGE-DEPTH METASURFACE POLARIZATION HOLOGRAPHIC 3D DISPLAY METHOD

CROSS REFERENCE TO RELATED APPLICATION

The present application claims priority benefit to Chinese application no. 202311561884.3, filed Nov. 22, 2023, the entire content of which is incorporated herein by reference.

TECHNICAL FIELD

The present disclosure relates to the holographic display technology, and particularly relates to a large-depth metasurface polarization holographic 3D display method.

BACKGROUND 3D holographic display can fully record and reconstruct wavefront information, making it one of the most ideal 3D display technologies. However, affected by a pixel size of the spatial light modulators, holographic 3D display is subjected to a narrow viewing angle, restricting its applicable scope. With the development of micro-nano technology, metasurface devices provide new ideas for the development of 3D meta-holography due to their advantages, such as small pixel size and light weight. Metasurface devices, composed of sub-wavelength unit structures, are capable of manipulating the amplitude, phase, and polarization state of incident light. By using the traditional Gerchberg-Saxton algorithm, some researchers have achieved metasurface-based holographic 3D reconstruction. However, as the propagation distance increases, the spatial frequency of the object will become aliased, limiting the reconstruction depth. By using subwavelength pixelated plasma metasurface structures, some researchers have achieved holographic 3D in the visible and near-infrared ranges, expanding a depth to 1.3 mm, nevertheless, it is still difficult to meet the needs of large-depth holographic 3D display. At present, how to achieve large-depth holographic 3D display is an urgent problem to be solved, and how to achieve independent control of polarization state while achieving large-depth holographic 3D display to increase the information quantity presents a new challenge.

SUMMARY

The present disclosure provides a large-depth metasurface polarization holographic 3D display method, including:
  for two different 3D objects, that is, a first 3D object and a second 3D object, performing calculations based on an angular spectrum diffraction theory to obtain a first metasurface hologram and a second metasurface hologram of the two 3D objects respectively, and performing left-handed circularly polarized light holographic reconstruction and right-handed circularly polarized light holographic reconstruction by using the first metasurface hologram and the second metasurface hologram, respectively;
  performing interleaved row-by-row insertion of the first and the second metasurface holograms to encode into a synthetic hologram, optimizing phases of the synthetic hologram by using an error diffusion algorithm to obtain phase information required by metasurface structures, that is, meta-phase information;
  designing the metasurface structures based on the meta-phase information, and making the metasurface structure in the odd rows sensitive to the left-handed circularly polarized light, and the metasurface structure in the even rows sensitive to the right-handed circularly polarized light; and
  performing holographic 3D reconstruction by illuminating the metasurface structures with laser; when the metasurface structures are illuminated by the left-handed circularly polarized light, the metasurface structure only in the odd rows is sensitive to incident light, such that a phase of light field can be modulated, in which case, a large-depth holographic reconstruction image of the first 3D object can be seen; when the metasurface structures are illuminated by the right-handed circularly polarized light, the metasurface structure only in the even rows is sensitive to incident light such that the phase of light field can be modulated, in which case, a large-depth holographic reconstruction image of the second 3D object can be seen; and when the metasurface structures are illuminated by the left-handed circularly polarized light and the right-handed circularly polarized light simultaneously, the large-depth holographic reconstruction images of the first 3D object and the second 3D object can be seen at the same time.

By obtaining the obtain meta-phase information required by metasurface structures, the large-depth metasurface polarization holographic 3D display method provided in the present disclosure designs the metasurface structures based on the meta-phase information, making a metasurface structure in odd rows sensitive to left-handed circularly polarized light, and a metasurface structure in even rows sensitive to right-handed circularly polarized light, such that independent control over different polarization states is achieved, and metasurface structures of adjacent rows will not generate crosstalk during the diffraction process due to mutual diffraction. Therefore, the method in the present disclosure achieves the modulation of polarization states while achieving the large-depth holographic 3D display, and avoids diffraction crosstalk between the reconstructed images of different polarization states.

BRIEF DESCRIPTION OF THE DRAWINGS

FIGS. 4(a)-(b) illustrate large-depth reconstruction effects of a first 3D object; and FIGS. 4(c)-(d) illustrate large-depth reconstruction effects of a second 3D object.

It should be understood that the above figures are only schematic and not drawn to scale.

DETAILED DESCRIPTIONS OF THE EMBODIMENTS

A large-depth metasurface polarization holographic 3D display method provided in the present disclosure will be further described below with reference to the embodiments. It should be noted that the following embodiments are merely illustrative of the present disclosure and cannot be understood as a limitation to the scope of protection of the present disclosure. Those skilled in the art may make some non-essential improvements and adjustments according to the contents of the present disclosure, which all fall within the scope of protection of the present disclosure.

Figure 1:
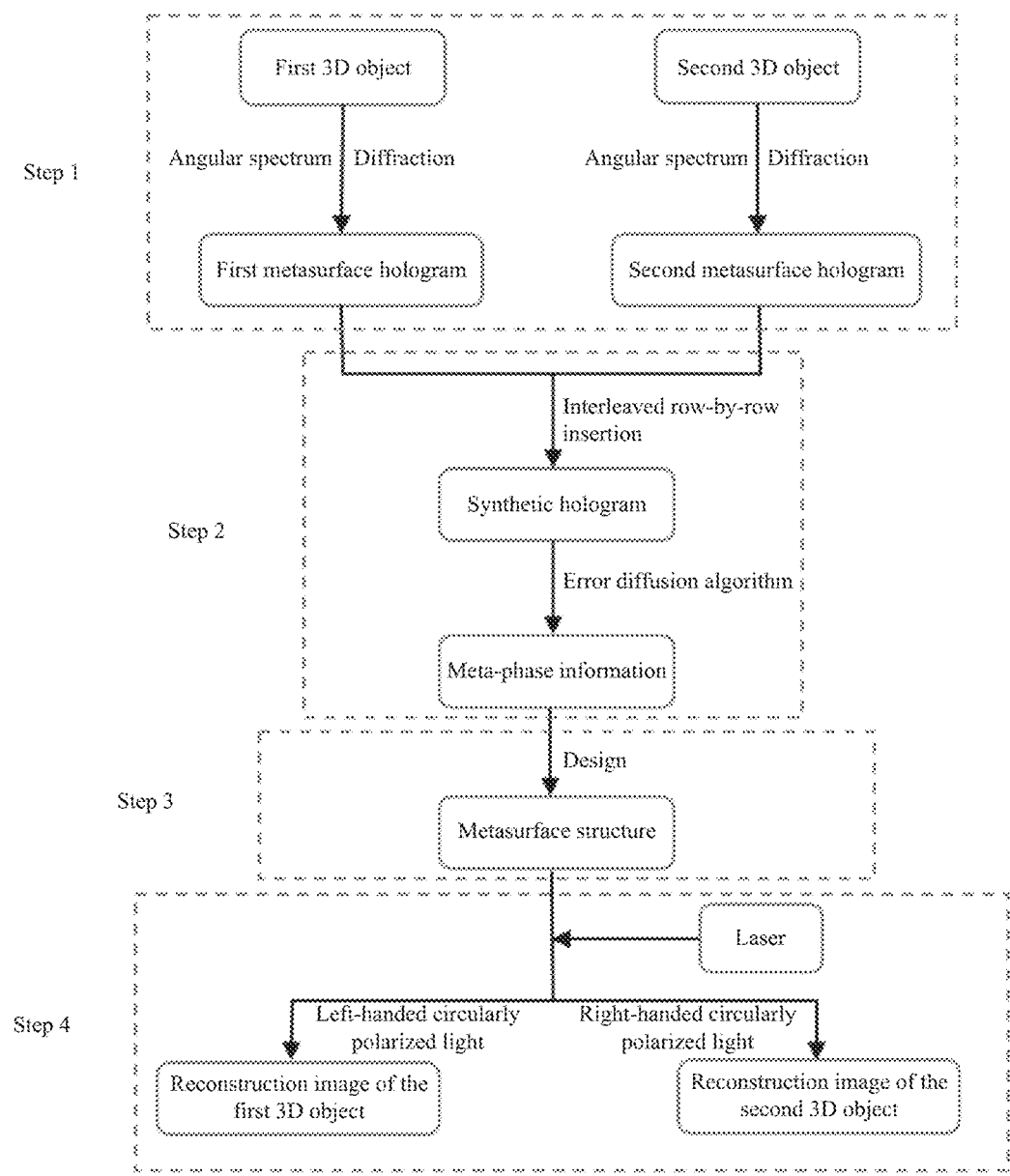
FIG. 1 is a schematic flow diagram of a large-depth metasurface polarization holographic 3D display method according to one or more of the embodiments in the present disclosure.

FIG. 1 is a schematic flow diagram of large-depth metasurface polarization holographic 3D display method according to one or more of the embodiments in the present disclosure. The large-depth metasurface polarization holographic 3D display method includes four steps as follows:

step 1, for two different 3D objects, that is, a first 3D object and a second 3D object, performing calculations based on an angular spectrum diffraction theory to obtain a first metasurface hologram and a second metasurface hologram of the two 3D objects respectively, and performing left-handed circularly polarized light holographic reconstruction and right-handed circularly polarized light holographic reconstruction by using the first metasurface hologram and the second metasurface hologram, respectively;

step 2, performing interleaved row-by-row insertion of the first and the second metasurface holograms to encode into a synthetic hologram, optimizing phases of the synthetic hologram by using an error diffusion algorithm to obtain phase information required by metasurface structures, that is, meta-phase information;

step 3, designing the metasurface structures based on the meta-phase information generated in the step 2, making a metasurface structure in odd rows sensitive to left-handed circularly polarized light, and a metasurface structure in even rows sensitive to right-handed circularly polarized light, such that independent control over different polarization states is achieved, and metasurface structures of adjacent rows will not generate crosstalk during the diffraction process due to mutual diffraction; and step 4, performing holographic 3D reconstruction by illuminating the metasurface structures with laser; when the metasurface structures are illuminated by the left-handed circularly polarized light, the metasurface structure only in the odd rows is sensitive to incident light, such that a phase of light field can be modulated, in which case, a large-depth holographic reconstruction image of the first 3D object can be seen; when the metasurface structures are illuminated by the right-handed circularly polarized light, the metasurface structure only in the even rows is sensitive to incident light such that the phase of light field can be modulated, in which case, a large-depth holographic reconstruction image of the second 3D object can be seen; and when the metasurface structures are illuminated by the left-handed circularly polarized light and the right-handed circularly polarized light simultaneously, the large-depth holographic reconstruction images of the first 3D object and the second 3D object can be seen at the same time. The method in the present disclosure achieves the modulation of polarization states while achieving the large-depth holographic 3D display, and avoids diffraction crosstalk between the reconstructed images of different polarization states. In the step 1, for any of the 3D objects, complex amplitude distributions of the 3D object and a hologram plane are expressed as:

$$T_0(x_0, y_0; 0) = \int\int_{-\infty}^{\infty} A_0(f_x, f_y; 0)\exp[j2\pi(x_0 f_x + y_0 f_y)]df_x df_y, \quad (1)$$

$$T(x, y; z) = \int\int_{-\infty}^{\infty} A(f_x, f_y; z)\exp[j2\pi(xf_x + yf_y)]df_x df_y, \quad (2)$$

where $T_0$ and $T$ are the complex amplitude distributions of the 3D object and the hologram plane, respectively; $x_0$ and $y_0$ are position coordinates of the 3D object; x and y are position coordinates of the hologram plane; $f_x$ and $f_y$ are spatial frequencies of the light field in an x direction and a y direction, respectively; j is an imaginary unit; Z is a distance between the 3D object and the hologram plane; and $A_0(f_x, f_y; 0)$ and $A(f_x, f_y; 0)$ are spatial spectra of the 3D object and the hologram plane, respectively, and the Helmholtz equation is solved to obtain the following formulae:

$$A(f_x, f_y; z) = A_0(f_x, f_y; 0)H(f_x, f_y; z), \quad (3)$$

$$H(f_x, f_y; z) = \exp(j\varphi(f_x, f_y; z)) = \exp\left(j2\pi z\sqrt{\lambda^{-2} - f_x^2 - f_y^2}\right), \quad (4)$$

where $H(f_x, f_y; z)$ is a transfer function; $\varphi(f_x, f_y; z)$ is a phase of the transfer function; and $\lambda$ is a wavelength.

Therefore, for the two different 3D objects, that is, the first 3D object and the second 3D object, the corresponding complex amplitude distributions on the hologram plane can be directly obtained by solving Formula (3):

$$T_{LCP} = \mathcal{F}^{-1}\{\mathcal{F}[T_1(x, y; 0)] \cdot H_{LCP}(f_x, f_y; z)\}, \quad (5)$$

$$T_{RCP} = \mathcal{F}^{-1}\{\mathcal{F}[T_2(x, y; 0)] \cdot H_{RCP}(f_x, f_y; z)\}, \quad (6)$$

where $T_{LCP}$ is the complex amplitude distribution of the first 3D object on the hologram plane; $T_{RCP}$ is the complex amplitude distribution of the second 3D object on the hologram plane; F and $F^{-1}$ denote Fourier transform and inverse Fourier transform, respectively; $T_1(x, y; 0)$ and $T_2(x, y; 0)$ the complex amplitude distributions of the first 3D object and the second 3D object, respectively; and $H_{LCP}(f_x, f_y; z)$ and $H_{RCP}(f_x, f_y; z)$ denote transfer functions of the first 3D object and the second 3D object, respectively.

When calculating the hologram, operations involved in discrete sampling of the hologram will introduce errors, thereby resulting in light field aliasing. In order to avoid aliasing errors, a local signal frequency $M_f$ and a sampling frequency $\Delta f_x$ of the transfer function need to meet the following conditions:

$$M_f = \frac{-f_x z}{\sqrt{\lambda^{-2} - f_x^2 - f_y^2}}, \quad (7)$$

-continued $$\Delta f_x \geq 2|M_f|. \quad (8)$$

When calculating a metasurface hologram, the sampling frequency is determined by the following formula:

$$\Delta f_x = (2Np)^{-1} \quad (9)$$

where N is a number of pixels of the metasurface hologram in the x direction, and p is a pixel pitch. Therefore, in order to achieve the large-depth metasurface holographic display, the transfer function can only be a band-limited function. According to Formula (8), the transfer function in the x direction should be constrained within the range shown in the following formulae:

$$\frac{f_x^2}{f_{xlimit}^2} + \frac{f_y^2}{\lambda^2} \leq 1, \quad (10)$$

$$f_{xlimit} = \frac{1}{\lambda\sqrt{\left(\frac{z}{Np}\right)^2 + 1}}, \quad (11)$$

where $f_{xlimit}$ is a maximum frequency of the transfer function in the x direction. It can be obtained from Formula (10) that a bandwidth limit of the transfer function in the x direction forms a regular ellipse with a y-axis as a major axis, similarly, a bandwidth limit in a y direction forms a regular ellipse with an x-axis as the major axis, and an overlapping area of the two ellipses is a band-limited area of the transfer function. The method in the present disclosure extends a depth of the metasurface holographic 3D display by limiting high-frequency information of the transfer function, and finally generates the first and second metasurface holograms, to achieve the function of large-depth deep holographic 3D display. Pixel pitches of the two metasurface holograms in the x direction and the y direction are p and 2p, respectively.

The method in the present disclosure can separately realize the functions of achieving the large-depth holographic 3D display and polarized holographic 3D display. In order to achieve independent control of the polarization states, in the step 2, complex amplitude information of the first and the second metasurface holograms are synthesized by interleaved row-by-row insertion to obtain the complex amplitude distribution of the synthetic hologram. The synthetic hologram has a pixel pitch of p in both the x direction and the y direction, the odd rows in the y direction correspond to the complex amplitude of the first metasurface hologram, the even rows in the y direction correspond to the complex amplitude of the second metasurface hologram Since the designed metasurface is phase-modulated, the complex amplitude information needs to be converted into phase information, all pixels of the synthetic hologram are scanned and optimized one by one using the error diffusion algorithm, so as to obtain meta-phase information required by the metasurface structures.

Figure 2:
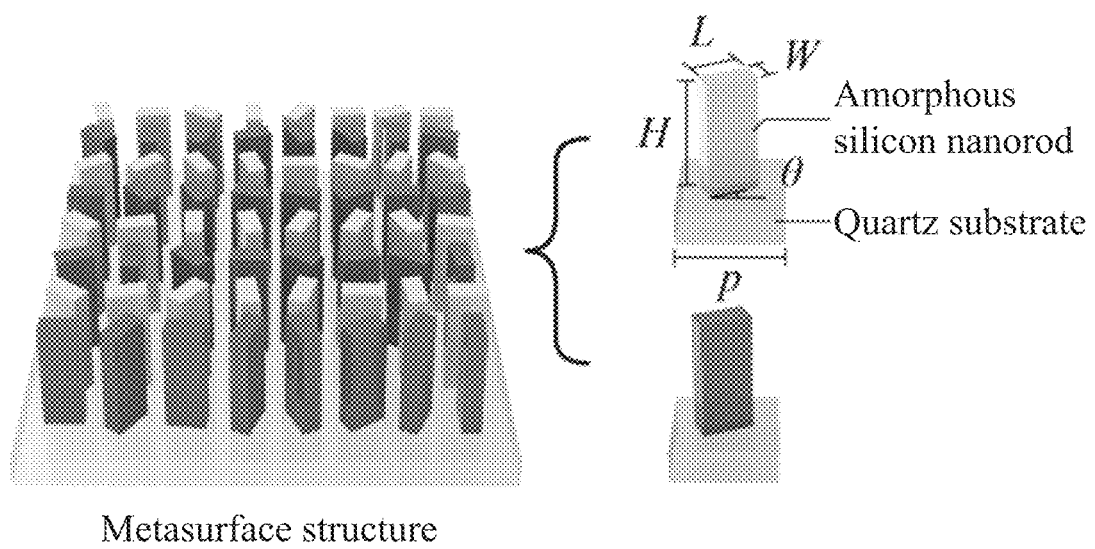
FIG. 2 is a schematic diagram of a metasurface structure of a large-depth metasurface polarization holographic 3D display method according to one or more of the embodiments in the present disclosure.

As shown in FIG. 2, in the step 3, the metasurface structure independently modulates a phase of each unit structure based on a principle of geometric phase control, each unit structure of the metasurface is composed of rectangular amorphous silicon nanorods fabricated on a quartz substrate, a length, width, and height of each of the rectangular amorphous silicon nanorods are denoted by L, W, and H, respectively, a period thereof is denoted by p, and a rotation angle of each of the rectangular amorphous silicon nanorods relative to the x-axis is θ, and the phase can be controlled by rotating an angle of each of the rectangular amorphous silicon nanorods, and a phase offset is $\varphi_1 = \pm 2\theta$, where a positive sign is taken when the polarization state is the left-handed circularly polarized light, and a negative sign is taken when the polarization state is the right-handed circularly polarized light. The metasurface structures are designed based on the meta-phase information generated in the step 2, the metasurface structure in the odd rows is sensitive to the left-handed circularly polarized light, and the metasurface structure in the even rows is sensitive to the right-handed circularly polarized light, thereby achieving independent control over different polarization states.

Figure 3:
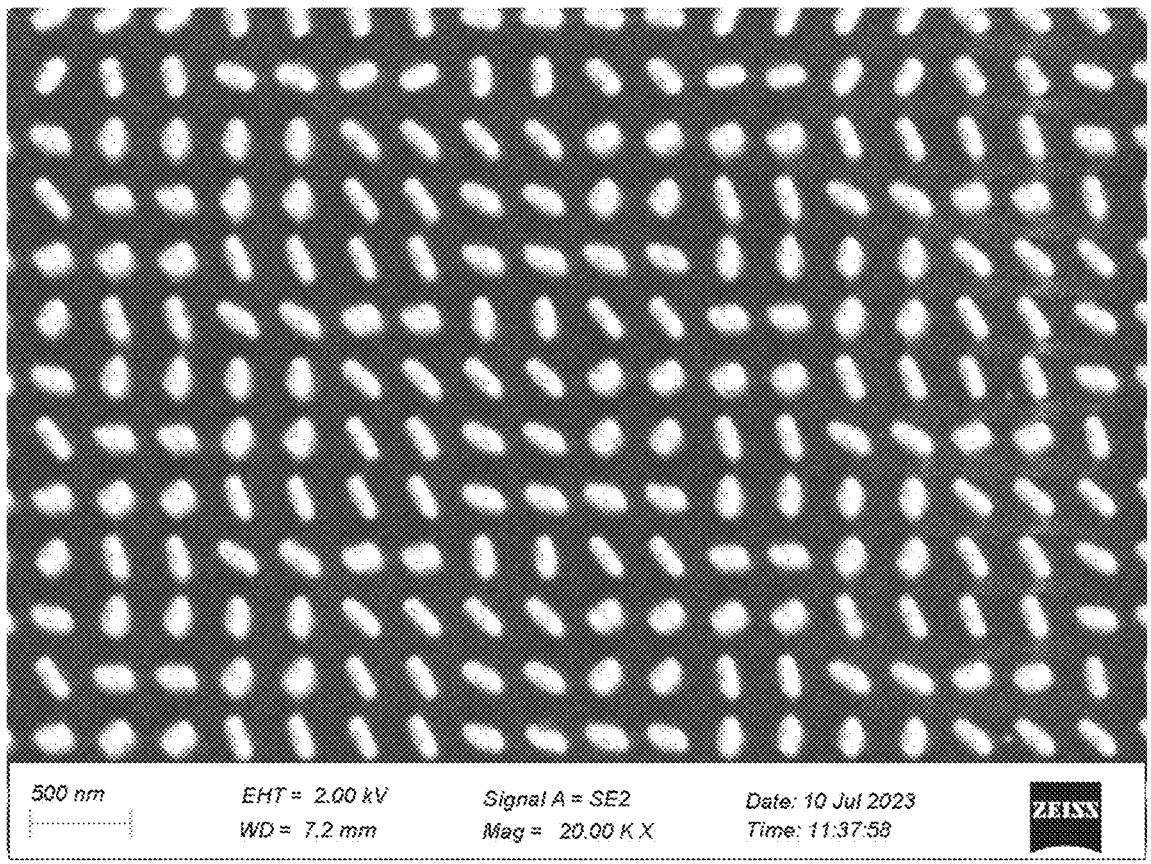
FIG. 3 is a schematic diagram of a metasurface structure of a large-depth metasurface polarization holographic 3D display method according to one or more of the embodiments in the present disclosure.
Figure 4:
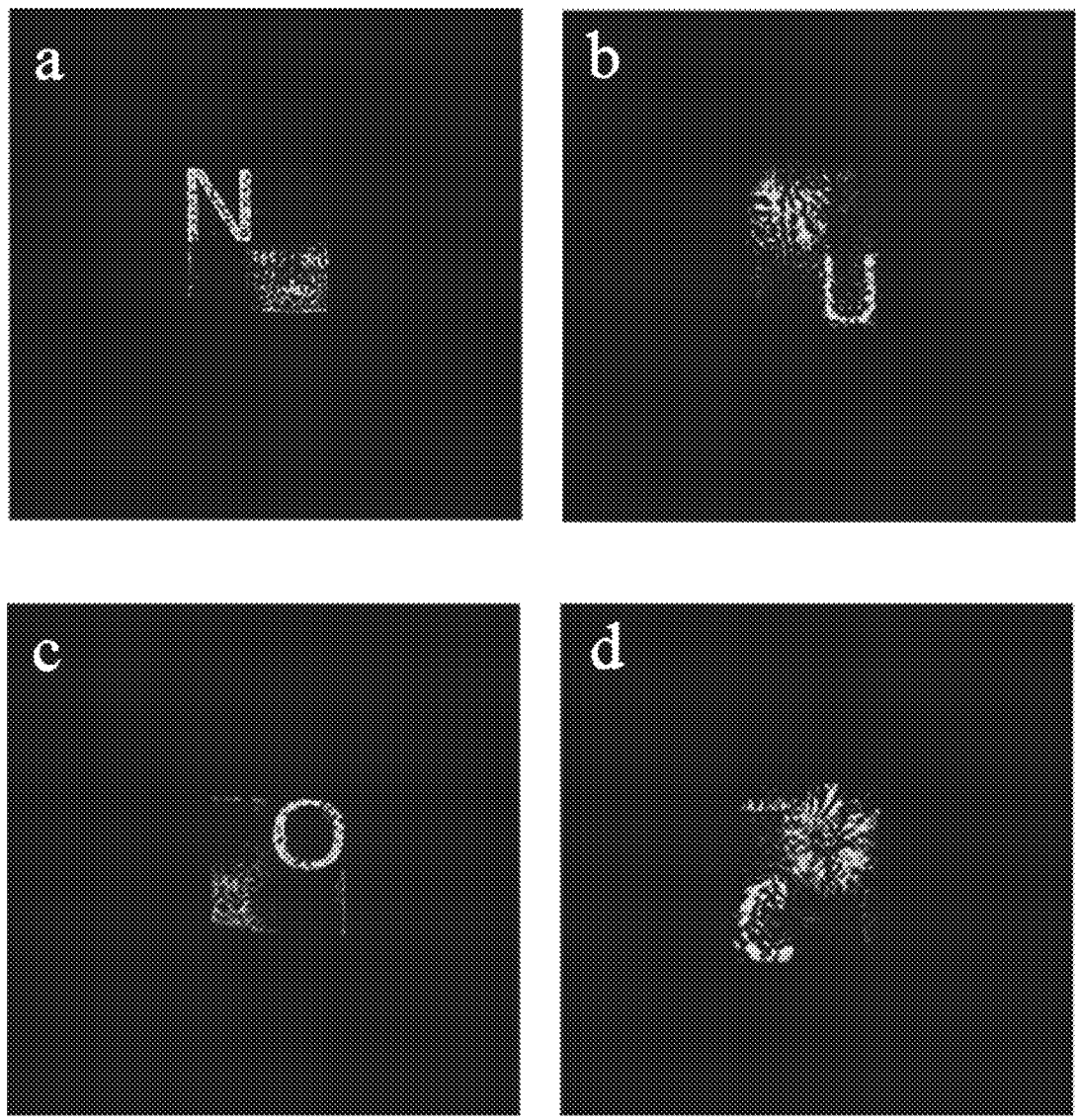
FIG. 4 is a schematic flow diagram of reconstruction effects of a large-depth metasurface polarization holographic 3D display method according to one or more of the embodiments in the present disclosure.

An experimental example of implementing the large-depth metasurface polarization holographic 3D display method is described below, and in this embodiment, two letters, "N" and "U", are selected as a first 3D object recorded corresponding to a left-handed circular polarization state, and two other letters, "O" and "C", are selected as a second 3D object recorded corresponding to a right-handed circular polarization state. Specifically, reconstruction distances for the letters "N" and "O" are both 3 mm, while reconstruction distances for the letters "C" and "U" are both 70 mm. Based on an angular spectrum diffraction theory, light field distributions of the first 3D object and the second 3D object are calculated separately, a first metasurface hologram and a second metasurface hologram are correspondingly generated respectively, and left-handed circularly polarized light holographic reconstruction and right-handed circularly polarized light holographic reconstruction are performed by using the first metasurface hologram and the second metasurface hologram, respectively; A synthetic hologram is generated by interleaved row-by-row insertion, the odd rows in the y direction correspond to the complex amplitude of the first metasurface hologram, the even rows in the y direction correspond to the complex amplitude of the second metasurface hologram. A phase is optimized using an error diffusion algorithm to obtain meta-phase information. A metasurface structure is designed based on the meta-phase information, and fabricated via electron beam lithography, as shown in FIG. 3, it is a top view of a metasurface structure taken under a scanning electron microscope. An amorphous silicon nanorod has a length, width, and height of 210 nm, 400 nm, and 90 nm, respectively, with a period of 300 nm. The metasurface structure has a resolution of 5000×5000, and a pixel pitch of 0.3 μm. Holographic reconstruction is performed using a laser with a wavelength of 671 nm, and a polarization state of incident light is converted using a polarizer and a quarter-wave plate of the corresponding wavelength. When an incident beam is left-handed circularly polarized, and the metasurface structures are illuminated by the left-handed circularly polarized light, the metasurface structure only in the odd rows is sensitive to incident light, such that a phase of light field can be modulated, in which case, a large-depth holographic reconstruction image of the first 3D object (letters "N" and "U") can be seen; and reconstructed images are shown in FIGS. 4(a)-(b), and the letters "N" and "U" are focused at diffraction distances of 3 mm and 70 mm, respectively. When an incident beam is circularly polarized right-handed, and the metasurface structures are illuminated by the right-handed circularly polarized light, the metasurface structure only in the odd rows is sensitive to incident light, such that a phase of light field can be modulated, in which case, a large-depth holographic reconstruction image of the second 3D object (that is, letters "O" and "C") can be seen; and reconstructed images are shown in FIGS. 4(c)-(d), and the letters "O" and "C" are focused at diffraction distances of 3 mm and 70 mm, respectively. When the metasurface structures are illuminated by the left-handed circularly polarized light and the right-handed circularly polarized light simultaneously, large-depth holographic reconstruction images of the first 3D object and the second 3D object (that is, the letters "N", "U", "O" and "C") can be seen at the same time. Experiments have verifies that the method in the present disclosure can achieve the large-depth metasurface polarization holographic 3D display.

What is claimed is:

1. A large-depth metasurface polarization holographic 3D display method, comprising:

for two different 3D objects, that is, a first 3D object and a second 3D object, performing calculations based on an angular spectrum diffraction theory to obtain a first metasurface hologram and a second metasurface hologram of the two 3D objects respectively, and performing left-handed circularly polarized light holographic reconstruction and right-handed circularly polarized light holographic reconstruction by using the first metasurface hologram and the second metasurface hologram, respectively;

performing interleaved row-by-row insertion of the first and the second metasurface holograms to encode into a synthetic hologram, optimizing phases of the synthetic hologram by using an error diffusion algorithm to obtain phase information required by metasurface structures, that is, meta-phase information;

designing the metasurface structures based on the meta-phase information, and making a metasurface structure in odd rows sensitive to left-handed circularly polarized light, and a metasurface structure in even rows sensitive to right-handed circularly polarized light; and performing holographic 3D reconstruction by illuminating the metasurface structures with laser; when the metasurface structures are illuminated by the left-handed circularly polarized light, the metasurface structure only in the odd rows is sensitive to incident light, such that a phase of light field can be modulated, in which case, a large-depth holographic reconstruction image of the first 3D object can be seen; when the metasurface structures are illuminated by the right-handed circularly polarized light, the metasurface structure only in the even rows is sensitive to incident light such that the phase of light field can be modulated, in which case, a large-depth holographic reconstruction image of the second 3D object can be seen; and when the metasurface structures are illuminated by the left-handed circularly polarized light and the right-handed circularly polarized light simultaneously, the large-depth holographic reconstruction images of the first 3D object and the second 3D object can be seen at the same time.

2. The large-depth metasurface polarization holographic 3D display method according to claim 1, wherein, for any of the 3D objects, complex amplitude distributions of the 3D object and a hologram plane are expressed as:

$$T_0(x_0, y_0; 0) = \int\int_{-\infty}^{\infty} A_0(f_x, f_y; 0)\exp[j2\pi(x_0 f_x + y_0 f_y)]df_x df_y$$

$$T(x, y; z) = \int\int_{-\infty}^{\infty} A(f_x, f_y; z)\exp[j2\pi(xf_x + yf_y)]df_x df_y$$

in the formulae, $T_0$ and $T$ are the complex amplitude distributions of the 3D object and the hologram plane, respectively; $x_0$ and $y_0$ are position coordinates of the 3D object; $x$ and $y$ are position coordinates of the hologram plane; $f_x$ and $f_y$ are spatial frequencies of the light field in an $x$ direction and a $y$ direction, respectively; $j$ is an imaginary unit; $z$ is a distance between the 3D object and the hologram plane; and $A_0(f_x, f_y; 0)$ and $A(f_x, f_y; z)$ are spatial spectra of the 3D object and the hologram plane, respectively, and the Helmholtz equation is solved to obtain the following formulae:

$$A(f_x, f_y; z) = A_0(f_x, f_y; 0)H(f_x, f_y; z)$$

$$H(f_x, f_y; z) = \exp(j\varphi(f_x, f_y; z)) = \exp\left(j2\pi z\sqrt{\lambda^{-2} - f_x^2 - f_y^2}\right)$$

in the formulae, $H(f_x, f_y; z)$ is a transfer function; $\varphi(f_x, f_y; z)$ is a phase of the transfer function; and $\lambda$ is a wavelength;

for the first 3D object and the second 3D object, the corresponding complex amplitude distributions on the hologram plane can be directly obtained:

$$T_{LCP} = \mathcal{F}^{-1}\{\mathcal{F}[T_1(x, y; 0)] \cdot H_{LCP}(f_x, f_y; z)\}$$

$$T_{RCP} = \mathcal{F}^{-1}\{\mathcal{F}[T_2(x, y; 0)] \cdot H_{RCP}(f_x, f_y; z)\}$$

in the formulae, $T_{LCP}$ is the complex amplitude distribution of the first 3D object on the hologram plane; $T_{RCP}$ is the complex amplitude distribution of the second 3D object on the hologram plane; $\mathcal{F}$ and $\mathcal{F}^{-1}$ denote Fourier transform and inverse Fourier transform, respectively; $T_1(x, y; 0)$ and $T_2(x, y; 0)$ the complex amplitude distributions of the first 3D object and the second 3D object, respectively; and $H_{LCP}(f_x, f_y; z)$ and $H_{RCP}(f_x, f_y; z)$ denote transfer functions of the first 3D object and the second 3D object, respectively;

a local signal frequency $M_f$ and a sampling frequency $\Delta f_x$ of the transfer function need to meet the following conditions:

$$M_f = \frac{-f_x z}{\sqrt{\lambda^{-2} - f_x^2 - f_y^2}}$$

$$\Delta f_x \geq 2|M_f|$$

when calculating a metasurface hologram, the sampling frequency is determined by the following formulae:

$$\Delta f_x = (2Np)^{-1}$$

in the formulae, N is a number of pixels of the metasurface hologram in the x direction, p is a pixel pitch, wherein the transfer function can be a band-limited function, and the transfer function in the x direction should be constrained within the range shown in the following formula:

$$\frac{f_x^2}{f_{xlimit}^2} + \frac{f_y^2}{\lambda^2} \leq 1$$

$$f_{xlimit} = \frac{1}{\lambda\sqrt{\left(\frac{z}{Np}\right)^2 + 1}}$$

in the formulae, $f_{xlimit}$ is a maximum frequency of the transfer function in the x direction, a bandwidth limit of the transfer function in the x direction forms a regular ellipse with a y-axis as a major axis, similarly, a bandwidth limit in a y direction forms a regular ellipse with an x-axis as the major axis, and an overlapping area of the two ellipses is a band-limited area of the transfer function; a depth of the metasurface holographic 3D display is extended by limiting high-frequency information of the transfer function, and finally the first and second metasurface holograms capable of achieving the function of large-depth deep holographic 3D display are generated, and pixel pitches of the two metasurface holograms in the x direction and the y direction are p and 2p, respectively.

3. The large-depth metasurface polarization holographic 3D display method according to claim 1, wherein performing alternately inserting row by row of the first and the second metasurface holograms comprises: complex amplitude information of the first and the second metasurface holograms are synthesized by interleaved row-by-row insertion to obtain the complex amplitude distribution of the synthetic hologram, the synthetic hologram has a pixel pitch of p in both the x direction and the y direction, the odd rows in the y direction correspond to the complex amplitude of the first metasurface hologram, and the even rows in the y direction correspond to the complex amplitude of the second metasurface hologram; and all pixels of the synthetic hologram are scanned and optimized one by one using the error diffusion algorithm, so as to obtain meta-phase information required by the metasurface structures.

4. The large-depth metasurface polarization holographic 3D display method according to claim 1, wherein the metasurface structure independently modulates a phase of each unit structure based on a principle of geometric phase control, each unit structure of the metasurface is composed of rectangular amorphous silicon nanorods fabricated on a quartz substrate; a rotation angle of each of the rectangular amorphous silicon nanorods relative to the x-axis is θ, the phase can be controlled by rotating an angle of each of the rectangular amorphous silicon nanorods, and a phase offset is $\varphi_1 = \pm 2\theta$; a positive sign is taken when the polarization state is the left-handed circularly polarized light, and a negative sign is taken when the polarization state is the right-handed circularly polarized light; and the metasurface structures are designed based on the meta-phase information generated, the metasurface structure in the odd rows is sensitive to the left-handed circularly polarized light, and the metasurface structure in the even rows is sensitive to the right-handed circularly polarized light, thereby achieving independent control over different polarization states.

* * * * *